US011682132B2

(12) United States Patent
Hanzel

(10) Patent No.: US 11,682,132 B2
(45) Date of Patent: Jun. 20, 2023

(54) DEVICE AND METHOD FOR DETERMINING THE LENGTH OF A LINE

(71) Applicant: Sven Hanzel, Bad Sooden-Allendorf (DE)

(72) Inventor: Sven Hanzel, Bad Sooden-Allendorf (DE)

( * ) Notice: Subject to any disclaimer, the term of this patent is extended or adjusted under 35 U.S.C. 154(b) by 794 days.

(21) Appl. No.: 16/490,319

(22) PCT Filed: Mar. 1, 2018

(86) PCT No.: PCT/EP2018/055026
§ 371 (c)(1),
(2) Date: Aug. 30, 2019

(87) PCT Pub. No.: WO2018/158359
PCT Pub. Date: Sep. 7, 2018

(65) Prior Publication Data
US 2020/0410708 A1 Dec. 31, 2020

(30) Foreign Application Priority Data

Mar. 3, 2017 (DE) ...................... 10 2017 203 552.8
Nov. 24, 2017 (DE) ...................... 10 2017 127 792.7

(51) Int. Cl.
*G06T 7/60* (2017.01)
*H01B 7/36* (2006.01)
(Continued)

(52) U.S. Cl.
CPC ................ *G06T 7/60* (2013.01); *G01B 7/026* (2013.01); *G01B 11/04* (2013.01); *G01B 11/043* (2013.01);
(Continued)

(58) Field of Classification Search
CPC . H01R 24/20; B41J 2/085; G06T 7/60; H01B 7/365; G01B 11/026; G16H 70/60; G16B 20/20
(Continued)

(56) References Cited

U.S. PATENT DOCUMENTS

| 4,581,796 A | 4/1986 | Fukuda et al. |
| 5,594,980 A * | 1/1997 | Tamura .............. G05B 19/4183 700/95 |
| 6,286,393 B1 * | 9/2001 | Messer ................ H02G 1/1265 81/9.41 |

FOREIGN PATENT DOCUMENTS

| DE | 4400824 A1 | 7/1995 |
| DE | 19814540 A1 | 10/1999 |

(Continued)

OTHER PUBLICATIONS

Examination Report dated Nov. 15, 2017 in related/corresponding DE Application No. 10 2017 203 552.8.
(Continued)

*Primary Examiner* — Phuoc H Doan
(74) *Attorney, Agent, or Firm* — Patent Portfolio Builders PLLC

(57) ABSTRACT

A method for determining the length of a line involves determining a length of a first electrical line, determining an identifier of the first electrical line, determining a length of a second electrical line, which is intended for installation in an electrical installation assembly, based on the length of the first electrical line and a starting length determined by means of the identifier.

11 Claims, 11 Drawing Sheets

(51) Int. Cl.
  *G01B 11/04* (2006.01)
  *G01B 21/02* (2006.01)
  *G01B 7/02* (2006.01)
  *H02G 1/00* (2006.01)
(52) U.S. Cl.
  CPC ............ *G01B 21/02* (2013.01); *H01B 7/365* (2013.01); *H02G 1/005* (2013.01)
(58) Field of Classification Search
  USPC ................................ 382/286; 29/33; 81/9.51
  See application file for complete search history.

(56) References Cited

FOREIGN PATENT DOCUMENTS

| DE | 19831090 A1 | 1/2000 |
|---|---|---|
| DE | 19918212 A1 | 11/2000 |
| DE | 19939638 A1 | 3/2001 |
| DE | 10248411 A1 | 4/2004 |
| DE | 102009015263 A1 | 10/2010 |
| DE | 202016102194 U1 | 5/2016 |
| EP | 1630826 A2 | 3/2006 |
| JP | H08327345 A | 12/1996 |
| WO | 9847209 A1 | 10/1998 |
| WO | 2015142151 A1 | 9/2015 |
| WO | 2017005282 A1 | 1/2017 |

OTHER PUBLICATIONS

International Search Report dated Jun. 4, 2018 in related/corresponding International Application No. PCT/EP2018/055026.
Written Opinion dated Jun. 4, 2018 in related/corresponding International Application No. PCT/EP2018/055026.
International Preliminary Report on Patentability dated Sep. 12, 2019 in related/corresponding International Application No. PCT/EP2018/055026 (references from IPRP not cited herewith have previously been made of record).

* cited by examiner

DEVICE AND METHOD FOR DETERMINING THE LENGTH OF A LINE

BACKGROUND AND SUMMARY OF THE INVENTION

Exemplary embodiments of the invention relate to a method for determining the length of a line of at least one electrical line, to a device for determining the length of a line of at least one electrical line, and an electrical line having an identifier.

During the production of industrial facilities, for example, buildings, power plants, special-purpose machinery, sewage treatment plants, or the like, a plurality of devices have to be electrically connected to one another correctly in order to enable reliable operation, monitoring, and/or control of the facility. For this purpose, corresponding devices are installed, for example, in one or more control cabinets, which are to be connected to one another via electrical lines.

Devices for determining the length of a line are known from DE 44 00 824 A1, DE 198 14 540 A1, WO 2015/142 151 A1, DE 199 39 638 A1, DE 102 48 411 A1, WO 98/472 09 A1, and DE 198 31 090 A1.

DE 10 2009 015 263 A1 discloses a trimming method of an optical cable, i.e., not an electrical conductor. Furthermore, a numeric specification is provided on the cable in addition to the cable identification as the length specification.

DE 20 2016 102 194 U1 discloses a method for determining the length of an electrical conductor. In this method a determination of length is performed by a measuring device, which originates from the middle of the cable drum. The measuring device cooperates with a cutting-to-length device, for example, cable scissors. These temporarily establish a contact during the cutting off in the case of a two-wire cable and thus enable the length determination by the measuring device.

DE 199 39 638 A1 discloses the length specifications of a scale and is therefore not part of a barcode, for example, FIG. 7. It is possible to estimate the cable length on the basis of the scale.

EP 1 630 826 A2 also discloses a separate scale and a barcode.

WO 98/47209 A1 discloses the stripping of a cable using at least one cutter device. D5 describes an option for ascertaining a line diameter and a line length.

U.S. Pat. Nos. 5,594,980 A and 5,581,796 A are larger facilities, from which trimmed cables are obtained from an endless length (for example, a cable drum).

In this case, a majority of the above-mentioned devices do not proceed from a set of multiple partially preconfigured lines, but rather a cable drum.

Firstly, "straight cutting" of the cable beginning often typically takes place. In this case, for example, as in WO 98/47209 A1 (column 9, lines 20-23), the presence of a cable is detected by a light barrier, however this light barrier is not used to determine a starting measurement point for length determination, but rather the measurement point is reached or set by a first initial cutting to length.

WO 2015/142 151 A1 discloses measuring and trimming a cable from a cable drum.

One or more individually configured electrical lines, for example, in the form of one or more cables or cable harnesses, are installed on one or more terminals of the devices, for example, in the form of clamps, in accordance with a circuit diagram and a control cabinet layout. The electrical line is selected in accordance with the requirements depending on the intended use. This line can be, for example, a copper cable or a glass fiber cable, an insulated cable, and/or a single-strand or multistrand cable. The cross-section of the line can be dimensioned in this case in accordance with the current strength to be expected. In order that no superfluous electrical lines remain in the electrical installation assembly, for example, in the control cabinet, the length of the respective electrical line is adapted to the installation situation. The intentional use of colors is also performed according to the control and regulating technology laws and enhances the comprehensibility in the electrical installation assembly, for example, a control cabinet. Depending on the intended use, individual electrical lines and/or prepared line sets, for example, one or more cable harnesses, can alternately be connected to a device to connect the corresponding terminals of this device to respective terminals of other devices. The wiring is frequently executed as point-to-point direct wiring by means of connecting cables, which are each laid between two terminals of electrical devices. In this case, the wiring and wiring is an activity extremely susceptible to error and it is very difficult to maintain the overview in this case solely because of the large number of the cables. Moreover, the work on a control cabinet or distributor cabinet is very monotonous, whereby the probability of error is also increased.

An identification of individual lines is frequently performed manually and requires very accurate documentation, which in turn has to be comprehensible and unambiguous for later work. In facility wiring or in a building installation, this is moreover made more difficult by sometimes cryptic naming of the designations of cables and electrical devices. The various trades of the facility construction and the electrical equipment encounter one another at this point and unambiguous documentation is additionally made more difficult by the reconciliation required here.

In addition to the complex documentation of the wiring in circuit diagrams, a correct identification of the cables, in particular the cable ends, and terminals or terminal clamps is required. For this purpose, cables are frequently marked by written tags and terminal clamps by written stickers. It is accordingly documented in the circuit diagram which cable end is connected to which terminal clamp. During the initial preparation of wiring, a circuit diagram usually exists beforehand, to which the installer has to adhere.

To facilitate the handling during the laying of the connection cable, during the pre-configuration, an identification is applied to the cladding of the line by means of inkjet printing or fastened on the line by means of an identification carrier, for example, a sticker or tag. The identifier is of a nature in this case so that it is unique in the context of the facility wiring, which comprises a plurality of preconfigured lines, so that no further identical identifier exists in the electrical installation assembly. During the pre-configuration of the connection cables, a length section required for the respective connection cable is severed from a cable supply, which is wound onto a cable roll, for example. The items of information about the length of the line to be configured and the items of information contained in the identification are already provided at this point in time. The identifications are also attached to the line in the preconfiguration. The information contained in the identifications comprises the identifier of the terminals of electrical devices to which the line is to be connected in the electrical installation assembly, the route taken by the line, the cable type, and/or the wire position on a plug connector. The handling of connection cables during the wiring is facilitated by the known preconfiguration, but it has the disadvantage that the preconfiguration has to be carried out in a separate preconfiguration line, a variety of items of information has to be provided for the inscription of the cable, and logistics are required, so that precisely the correct, preconfigured connection cable is provided at an installation location, which is provided for the wiring there and is correctly inscribed.

Exemplary embodiments of the invention are directed to facilitating the configuration of at least one electrical line, in particular the preparation and specification of lengths for the purpose of configuring electrical lines.

Exemplary embodiments are also directed to facilitating a wiring procedure which, for example, comprises an assignment of the lines possibly to be configured on location to terminals of electrical devices.

According to embodiments, there is a method for determining the length of a line, a device for determining the length of a line, and an electrical line.

According to embodiment, a method for determining the length of a line comprises the following steps:
determining, in particular metrologically acquiring, a first electrical line that is cut to length, determining, in particular reading, an identifier of the first electrical line that is cut to length; and determining, in particular computing, a length of a second electrical line intended for installation in electrical installation assembly, on the basis of the first electrical line that is cut to length and a starting length determined by means of the identifier.

In contrast to WO 2015/142 151 A1, cutting to length is only performed on one side, wherein the length measuring device is solely used to determine the length of the severed excess cable ends, which are actually considered to be waste. Such cable ends do not occur at all in the routine cutting to length from a cable drum.

The first electrical line can advantageously be identified on the basis of the identifier and the starting length can be determined on the basis of this identification.

The starting length relates to an electrical line before it is severed into the first line and the second line.

The method can furthermore advantageously comprise one or more of the following steps:
Cutting to length at least one electrical line to a starting length, and/or assigning an identifier to the starting length, and/or storing the starting length and an assigned identifier. This can preferably be performed at the factory during the preparation and/or preconfiguration of the wiring set, and/or a cable bundle.
Furthermore, the method can comprise the following step:
Identifying the electrical line using an identification corresponding to the identifier, which identification is preferably applied on the surface or preferably to the surface of the line. The line having the starting length and the identification can be provided partially preconfigured as a single line or preferably having multiple further partially preconfigured lines as a cable bundle and/or wiring set to the worker for wiring an electrical installation assembly, for example, a control cabinet or a control cabinet partition.
The method can furthermore comprise the following step:
Cutting to length the electrical line for wiring the electrical installation assembly, wherein a first, excess electrical line results and wherein a second electrical line intended for use in the electrical installation assembly results.
The method can moreover advantageously comprise at least one of the following steps:

Acquiring the identification of the first line or the second line, preferably by means of image recognition, for example, by a camera, and/or ascertaining an identifier on the basis of the acquired identification.

The determination of a total length of the first line can also be performed in this step. For this purpose, inter alia, the line beginning is acquired metrologically, for example, by a light barrier.

Furthermore, embodiments involve a method for producing a first wiring set of electrical lines, which are each provided with at least one identification, which identifications can each be associated with a starting length, for example, on the basis of an identifier ascertainable by means of the identification, and preferably carrying out the above-mentioned method according to the invention for each of the electrical lines of the wiring set.

The above-mentioned method can moreover also be applied in a method according to the invention for producing a second wiring set of electrical lines, wherein the first wiring set of electrical lines is produced according to the above-mentioned method and wherein the first wiring set is intended for a first control cabinet and the second wiring set is intended for a second control cabinet, wherein during the production of the second wiring set, a control-cabinet-specific plan and/or a control-cabinet-specific documentation of the first control cabinet is compared to a control-cabinet-specific plan and/or a control-cabinet-specific documentation of the second control cabinet and the lines of the second wiring set, which are identically implemented in both the first and also the second control cabinet, are completely preconfigured, i.e., cut to the correct length and terminally provided at both ends with line connectors.

The lines, which are not identically implemented, can advantageously be contained in the second wiring set having a starting length and partially preconfigured or can be omitted.

With respect to the electrical line, the object is achieved by an electrical line, wherein an identification is attached to the electrical line, by means of which identification a length of a second electrical line, which is intended for installation in the electrical installation assembly, is determinable on the basis of the length of the electrical line and a starting length determined by means of the identifier.

A line type can be determined, in particular uniquely, based on the identification of the line, for example, based on an identifier ascertainable by means of the identification.

The identification on the surface can advantageously be a character set, which is preferably coded, and which is readable by means of a script identification. Alternatively, or additionally, the characters of the character set can be formed in such a way that they are differentiable on the curved surface of the line.

With respect to the device, according to embodiments, there is a device for line length determination comprising a recognition unit, which is used to determine an identifier of a first electrical line, wherein the device furthermore comprises a length measuring unit, which is used to determine a length of the first line, and wherein the device comprises a storage unit, which is operatively connected to the recognition unit and the length measuring unit, and which is used to acquire the identifier and the length of the first line, in particular to assign them to one another.

It is important in this context that the device comprises a first detection unit, which can preferably comprise a light barrier, which is used to determine the insertion of the first line into the device.

In addition, the first detection unit can be used to determine a reference point for the length measurement.

The first detection unit is used in particular for detecting a line beginning. While typical devices for cutting cable to length trim a cable after the insertion of the cable into the device and subsequently the cutting to length is performed by a so-called incremental transducer. In this case, this known technology is not intended for a detection of the line beginning by specifying the line beginning by the trimming. At the same time, a trimming device can advantageously be omitted in the present device according to the invention. A partial preconfiguration of lines as a work savings cannot be reasonably implemented in this manner by the prior art.

The device according to the invention can comprise a second detection unit for detecting a line end. Since the device moreover comprises a transportation unit for transporting the line through the device, it is necessary for the transportation unit to be stopped after the length measurement. For this purpose, a second sensor element can be provided for detecting the line end, which is preferably used for controlling the transportation unit.

The above-mentioned first and/or second detection unit can each be formed as optical sensors, in particular as light barriers. They comprise an emitter for emitting a light beam and a receiver for detecting the light beam in a design known per se.

The device can comprise a line conveyor unit for transporting lines having different line diameters, wherein the line conveyor unit comprises runways having different groove depths and/or groove widths, wherein the feed of the line to the runways takes place as a function of an ascertained line diameter and/or a variable dependent thereon.

The device can moreover comprise a supply device for inserting and transporting lines having different line diameters and/or cable diameters. The supply can preferably take place either by redirecting the lines or by axially moving one transportation roller and/or multiple transportation rollers.

Alternatively, one bearing roller or multiple bearing rollers opposite to the transportation roller can be equipped with corresponding runways or multiple bearing rollers can be arranged each having one runway.

The transportation unit and the length measuring unit can advantageously also be implemented in a single transportation roller, which can also be formed as a counter wheel at the same time. Alternatively, the bearing wheel can also be formed as the counter wheel.

The transportation of the line in the device itself can advantageously be performed by clamping the line between the length measuring unit, an incremental transducer, also called a counter wheel, can also be used here, and the transportation unit, in particular the transportation roller. The transportation of the line inside the device is advantageously carried out by the clamping and the movement of the transportation roller.

In this case, the transportation roller and/or the bearing roller can be displaceable diagonally, in particular perpendicularly, in relation to the feed direction of the line to be able to accommodate lines having larger cross-section.

Further advantageous embodiments of the device according to the invention will be explained in greater detail hereafter.

The identifier can advantageously be used to determine one line type from a plurality of line types of electrical lines, wherein the L line types are different electrical lines provided for the wiring of the electrical installation assembly.

The storage unit can advantageously be used to store the length and the identifier, for example, a designation such as starting and/or destination terminal designation, for example, as a data pair.

The recognition unit can advantageously be used to determine the identifier on the basis of an identification of the first line, with which the first line is identified, in particular is uniquely identifiable.

Alternatively, or additionally, an identification of the first line can be provided to the recognition unit for determining the identifier and/or the line type, preferably by optical acquisition. Alternatively, or optionally, the acquired identifier can also be associated with a line type.

The device can furthermore comprise a line conveyor unit, which is used to guide the first line along a first measurement route for the determination of the identifier by means of the recognition unit, and/or it can be used to guide the first line along a second measurement route for the determination of the length of the first line.

The device can furthermore advantageously comprise a communication unit, which is preferably operatively connected to the storage unit, and which is used to transmit the identifier and/or the line type and the length of the first line, in particular to a cutting-to-length unit.

The device can moreover comprise a housing, which is preferably handheld, and in which the recognition unit, the length measuring unit, the storage unit, the communication unit, and/or the line conveyor unit are arranged.

Moreover, a starting length of the first line assigned to the identifier and/or the line type can be stored in the storage unit, for example, as a data set, wherein the starting length corresponds to the length of an electrical line before a cutting-to-length step, during which cutting-to-length step the first line and a second line intended for use in the electrical installation assembly result.

Alternatively, or additionally, the storage unit can also be used to determine a configuration length, preferably by subtraction between the length of the first line and the starting length, based on the length of the first line and the starting length.

An end of the first line, which end is inserted or is insertable into the device, can be used as a reference point for the length measurement by means of the length measuring unit.

Furthermore, it can be problematic if the identification carriers are permanently connected to the line, for example, as adhesive signs or in combination with cable sleeves, as shown in FIG. 16. They then cannot be attached to the line in preparation, because they would also be cut off under certain circumstances when shortening the lines. They have to be attached during the completion of the non-configured ends, which means an additional work step, which is susceptible to error, for the worker.

The difficulty is to uniquely associate an identification carrier with a line. A line is uniquely identified, for example, in that the identifiers of all terminal points are indicated thereon. In the case of the incompletely configured line, however, at least one identifier is absent, whereby under certain circumstances some lines may not be uniquely identified without further items of information.

This stated problem is shown graphically in FIG. 17 on the basis of a so-called double occupancy. It is possible to confuse the two lines shown here, since the signs for identifying the terminal points B and C are only attached later, the worker lacks the information as to which of the two lines is to be connected to the terminal point A-B and which line is to be connected to the terminal point A-C.

To advantageously reduce the risk of incorrect wiring of partially preconfigured lines, the method according to the invention can moreover comprise the following further steps in the scope of the wiring of two terminal points of the electrical installation assembly:
- a) Providing a partially preconfigured line, comprising the electrical line and
  a first identification carrier for identifying a first of two terminal points;
  an identification on or to the line comprising items of information for producing a second identification carrier for identifying a second of the two terminal points and/or for associating a matching line connector.

The preconfiguration can preferably take place at the factory in the scope of the method for wiring, while the method for wiring itself is preferably carried out at the location of the installation of the line, i.e., at the electrical installation assembly to be wired, for example, the control cabinet.
- b) Cutting to length the electrical line to form a first electrical line and a second electrical line to be arranged in the electrical installation assembly, wherein the first electrical line bears the identification.

The second electrical line is used for the arrangement in the electrical installation assembly. It has the ideal installation length. The first electrical line can in this case ideally already have both a first identification carrier for identifying the first terminal point and also a line connector by means of which the line can be connected at the first terminal point. The first identification carrier and the first line connector do not necessarily have to be provided, however, but the risk of confusion when connecting the line is already substantial due to the arrangement of at least one of these two elements, which is known to a person skilled in the art as configuration. The one-sided configuration of an electrical line before its provision to a worker, i.e., the configuration at one end of the line, is understood in the scope of the present invention as a partial preconfiguration.

The first electrical line can preferably bear the identification having items of information for preparing an identification carrier. This identification carrier can ideally comprise, in a line having only two ends, the identifier of the second terminal point.

While in a preferred embodiment variant of the invention, the first identification carrier is thus attached at the factory during the preconfiguration before the delivery to a worker, the second identification carrier is thus only produced on location, during the installation of the electrical line in the electrical installation assembly, and arranged on the line.

This is performed by
- c) reading out the items of information of the identification by way of a readout device and
  c1 producing the second identification carrier for identifying the second terminal point and/or
  c2 providing the second line with a line connector predetermined by the identification.

The readout can be performed, for example, by a barcode scanner, if the identification is formed as a barcode. A printer can then perform the production of the identification carrier. Corresponding printers are known per se, for example, from Partex.

Alternatively, or additionally, a provision of the second line with a line connector predetermined by the identification can also be performed.

There are manifold embodiments in the case of the identification carriers for electrical lines. In addition to adhesive identification carriers, in particular identification carriers enclosing the electrical line at least in regions have proven to be practical. These can comprise marking signs which are directly printable or on which the identification is held, for example, as a sticker or as an insertion section in a viewing window.

Accordingly, the
- c) application of the identification carrier to or on the second electrical line to be arranged in the electrical installation assembly is performed depending on the embodiment of the identification carrier.

The above-mentioned additional method steps have the special advantage that when cutting the line to length, unintentionally cutting off an identification carrier is avoided, since the identification carrier is only produced on location.

In this case, the identification is located on the first line that is cut to length, which is typically often considered to be a waste product. However, these end sections, which are usually short, can be read out outstandingly and can be handled well because of their short length.

The provision of a partially preconfigured electrical line in step a) is advantageously performed by providing the line with a first identification carrier for identifying a first of two terminal points, wherein the identification of the line comprises items of information for producing a second identification carrier for identifying a second of the two terminal points.

Furthermore, the second electrical line formed after the cutting to length in step b) comprises the first identification carrier to be arranged in the electrical installation assembly.

Moreover, the preparation of the second identification carrier for identifying the second of the two terminal points is performed on the basis of the items of information read out in step c).

The application of the second identification carrier is then performed on the second electrical line, which is provided to be arranged in the electrical installation assembly in step d).

The identification having the items of information for preparing the second identification carrier for identifying the second of the two terminal points can advantageously be arranged on a wraparound label. This enables simple cutting off of the wraparound label from the first line which is cut to length, usually the waste end piece, and sticking onto a sheet. Moreover, such labels may be very easily scanned in and/or captured.

The identification having the items of information for producing the second identification carrier for identifying the second of the two terminal points can be formed as a barcode and/or a QR code. Known readout systems (barcode scanners, mobile telephone apps) can thus be used when capturing the above-mentioned items of information.

After step b), in particular after step d), an application of the line connector, in particular a plug, a wire end ferrule, and/or a cable lug can be performed, in particular at the second end of the second line which is cut to length, which is provided to be arranged in the electrical installation assembly.

The readout of the identification can be performed by a contactless scan, preferably an optical scan.

At least one of the two identification carriers can advantageously comprise, in addition to the identifier of the terminal points, items of information with respect to the line type, the cross section, and/or the color of the line. In the case of the second identification carrier, these items of information are part of the identification which are provided, for example, on the wraparound label.

After the readout of the items of information according to step c), an item of information about the line connector to be used can be produced by the readout device. For example, it can be displayed in a viewing area which line connector has to be attached to the second end of the second line.

Furthermore, the invention comprises a partially preconfigured electrical line, in particular for use in a method according to the invention, wherein the partially preconfigured line comprises a line connector for connection to a first terminal point of an electrical installation assembly at a first end and does not comprise a line connector at a second end.

In an end region of the second end, the line can comprise an identification comprising items of information for preparing an identification carrier for identifying a second terminal point of the electrical installation assembly.

Labeled lines are already known from DE 199 18 212 A1. However, lines preconfigured on one side having line connectors and identification carriers are not disclosed therein. The present preconfigured lines enable, in a refinement of the concept of DE 199 18 212 A1, an even faster and simpler connection of lines in an electrical installation assembly.

BRIEF DESCRIPTION OF THE DRAWING FIGURES

The invention will be described in greater detail hereafter on the basis of several embodiment variants and with the aid of the appended figures. In the figures.

DETAILED DESCRIPTION

Figure 1:
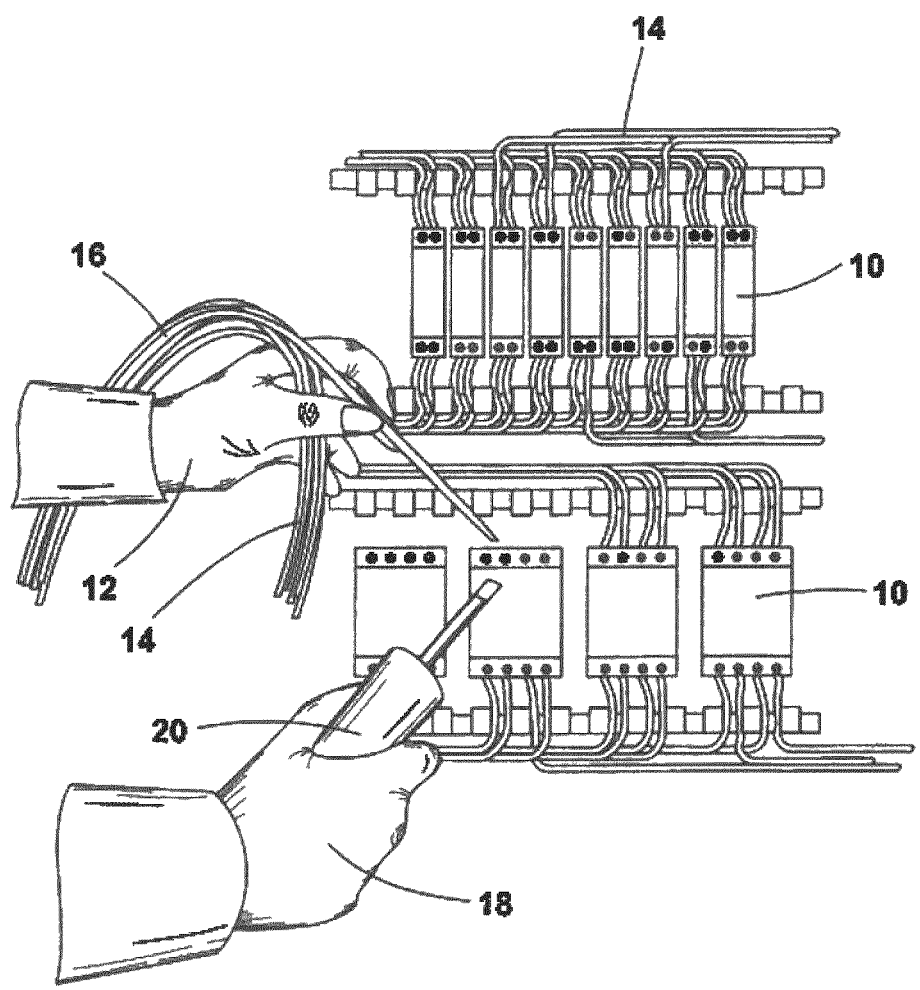
FIG. 1 shows a schematic illustration of the wiring of a control cabinet.

FIG. 1 shows a schematic illustration of a detail of a control cabinet, the first control cabinet. A plurality of devices 10, for example, switches, contactors, relays, control elements, etc. is provided in this control cabinet, which are already partially wired. Furthermore, the hands 12, 18 of an installer are schematically shown, who is presently inserting further cables 14 and/or lines into corresponding terminal clamps 16. As can be seen in FIG. 1, the installer has a cable bundle 17 or a wiring set between thumb and index finger and can thus grasp the individual cables 14 in a simple manner and insert them into the corresponding terminal clamp 16, before he then tightens the terminal clamps 16 using the screwdriver 20 located in the other hand 18.

The cable bundle 17 can comprise a plurality of lines having different cable thicknesses and colors in this case.

Moreover, it can be necessary to adapt the length of one or more electrical lines to obtain optimum wiring, in particular without excessively long and protruding electrical lines. For this purpose, the installer can shorten one or more of the lines, i.e., cut them to length, for example, by means of wire cutters (not shown) to individually adapt their length. This is necessary, for example, during initial wiring of an electrical installation assembly in which the length of the lines, which is sufficient to connect the devices to one another, is not yet known under certain circumstances.

For this purpose, one or more lines L0, in particular each having a starting length l0, can be prepared, using which the installer is to perform the wiring. These starting lengths l0 can be equal for all lines or can also be line-specific, i.e., can have a different starting length l0.

Figure 2:
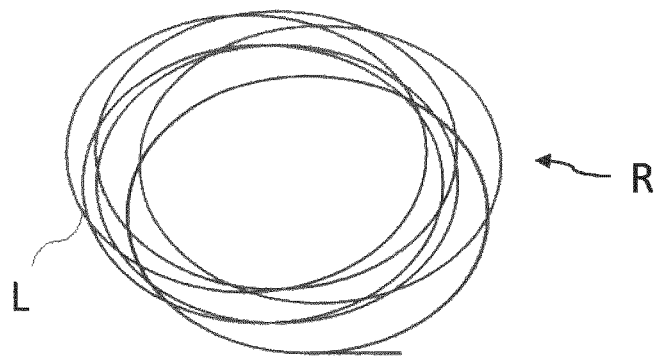
FIG. 2 shows a schematic illustration of a cable roll.

A line L0 having such a starting length l0 can be produced, for example, by cutting to length a section of a cable roll R. Such a cable roll is shown in FIG. 2.

Figure 3A:
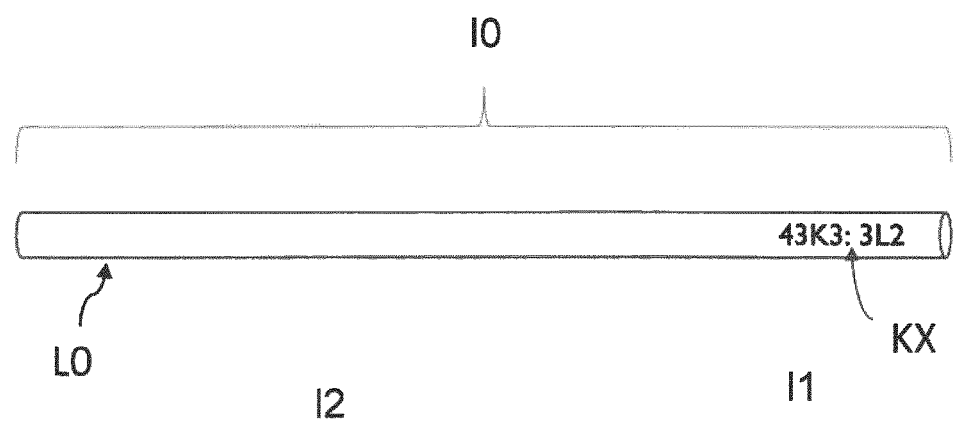
FIG. 3a shows a schematic illustration of an electrical line having a starting length.

A line L0 having a starting length l0 is shown in FIG. 3a. Such a line L0 having a starting length l0 can be produced by cutting to length a longer line L, as described in the preceding paragraph.

Figure 3B:
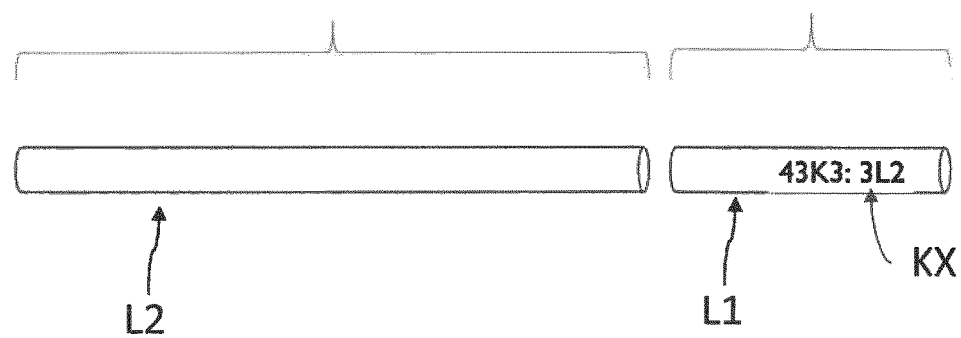
FIG. 3b shows a schematic illustration of a first electrical line having a first length and a second electrical line having a second length.

Two sections of this line L0 are shown in FIG. 3b, which result by cutting to length the line L0. The second line L2 is intended in this case to be installed in the electrical installation assembly and can remain directly in the electrical installation assembly, while the first line L1 is an excess line, which results when cutting the line L0 to length.

An identification KX is applied to the line L0, by means of which the starting length of the line L0 can be determined. This identification KX can already be applied to the line L, which forms the cable roll R. Alternatively, the identification KX can be applied to the line L during or after the cutting to length procedure to produce the line L0.

The identification KX can also be a property of the line L, L0, L1 itself. For example, the color of the line, its diameter, or other intrinsic features of the line L, L0, L1 can be used for its identification.

An identification KX can be associated in particular with a starting length l0 of the line L0 (or vice versa), in particular if it is known from which line type one or more lines having a starting length l0 are to be produced.

In the present case, in the embodiment according to FIG. 3a, an identification in the form of alphanumeric characters is applied to the line. However, the identification can also be performed in another manner, for example, as illustrated and described in FIGS. 4a, 4b, 4c, 4d and FIG. 5.

Figure 6:
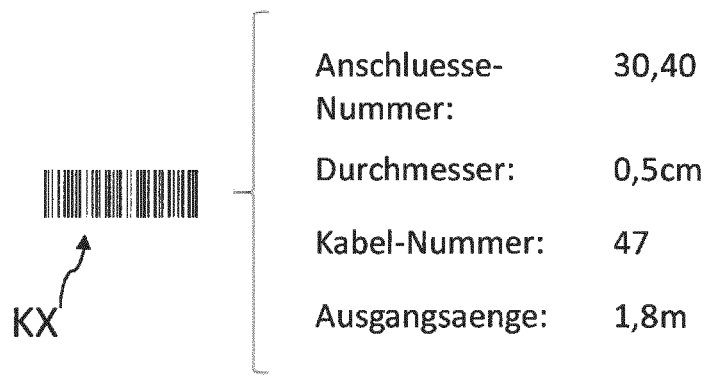
FIG. 6 shows a schematic illustration of the information ascertainable by means of an identification.

The information elements that can be associated with an identification KX are shown in FIG. 6. The line type can be identified, for example, by one or more terminal designations, for example, terminal numbers, to which the ends of the line L0 are to be connected. Furthermore, the line type can be identified by the diameter of the line L, with or without cladding. Moreover, the line type can be identified by a designation associated with the line L, for example, a cable number. One or more of these items of information (which form the identifier of the line L) and the starting length 10 of the line L0 are associated with the identification KX or can be contained in the identification KX. Instead of the barcode shown in FIG. 6, another type of the identification KX can also be performed, in particular an identification using clear text (Latin alphabet and/or Arabic numerals) is possible. Furthermore, a coding of one or more of the mentioned information elements is possible.

The identification can be provided at least once on a line L0 having the starting length 10. However, the line L0 can be identified with the identification KX multiple times. The identification KX is preferably applied to at least one end of the line L0 or applied to both ends of the line L0. After the line L0 is cut to length and the first line L1 and the second line L2 result, an identification KX is thus always present on the excess line L1, which can be used to identify the line L1.

Figure 4A:
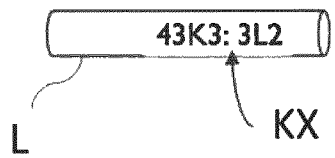
FIGS. 4a, 4b, 4c, 4d show schematic illustrations of various embodiments of an electrical line having an identification.

An identification KX in the form of an alphanumeric code applied to the line L is shown in FIG. 4a.

Figure 4B:
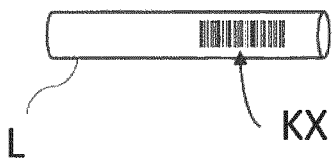

An identification KX in the form of a (2D) barcode is shown in FIG. 4b.

Figure 4C:
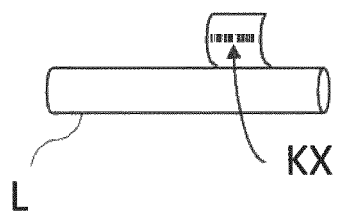

An identification KX in the form of a tag attached to the line L is shown in FIG. 4c. A code can in turn be provided on the tag. Furthermore, an identification in the form of a bushing is possible. Proprietary identification systems can also be used in this case for the identification.

Figure 4D:
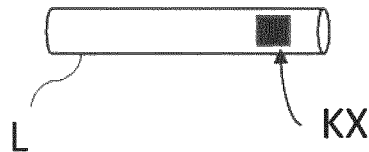

An identification KX in the form of an RFID chip, via which the line L can be identified, is shown in FIG. 4d.

For example, an electrical line having at least one identification KX in the form of an RFID chip can thus be provided. One or more of the RFID chips can be read out by means of a sensor used as a recognition unit.

The identification KX can alternatively or additionally also be implemented as a QR code.

Figure 5:
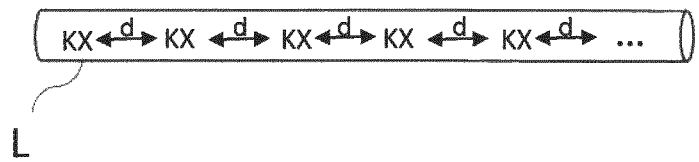
FIG. 5 shows a schematic illustration of a further embodiment of an electrical line provided with an identification.

FIG. 5 shows an embodiment of an electrical line having multiple identifications KX, which are preferably applied equidistantly to the line. On the one hand, the line can thus be identified and, on the other hand, the length of the line can be determined. A line having an identification according to FIG. 5 can thus be identified without the orientation of the line or the presence of an identification in a section of the line having to be noted in this case. Furthermore, the length of a section which results by cutting the line to length can be determined by the regular arrangement of the identifications on the line.

The line L shown in FIGS. 4a, 4b, 4c, 4d and FIG. 5 can be the line L0, L1, or L2.

Figure 7:
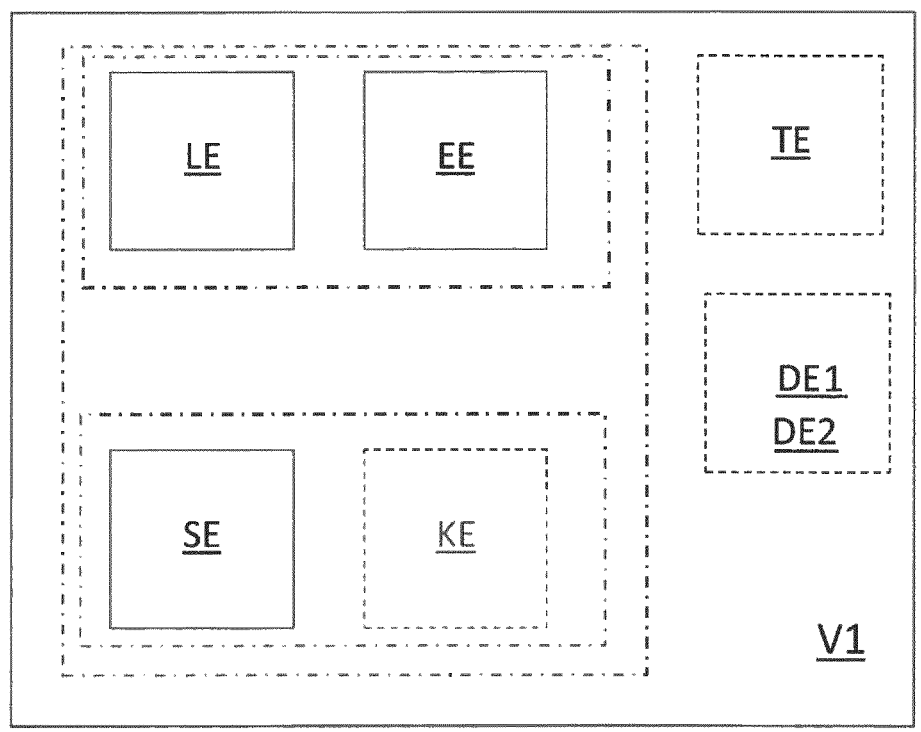
FIG. 7 shows a schematic illustration of an embodiment of a device for determining a length.

FIG. 7 shows an embodiment of a device V1 for determining the length of a line. The device V1 is preferably used for determining the length 11 of a first line L1, wherein the first line L1 results by cutting a line L0 to length into a first line L1 and a second line L2.

The units of the device V1 shown in FIG. 7 are particularly preferably arranged in a housing G in this case. However, it is also possible that one or more units are arranged outside the housing G and are operatively connected to the units located inside the housing G.

The device V1 comprises a length measuring unit LE for determining a length of an electrical line. For example, this can be a balance in this case. Furthermore, the length of a line can be optically acquired. In this case, the length measuring unit can be a photographic camera having an image recognition unit. For example, a comparison scale for length determination can be acquired together with the line and the length of the line can be determined therefrom.

Furthermore, the device V1 comprises a recognition unit EE, which enables it to determine an identifier of the line. For example, the recognition unit can be a camera that acquires an identification of the line by means of an image recognition unit. An identifier of the line, by means of which the line is identifiable, is defined by means of the identification. The identifier can be an information element, by means of which the line is identifiable. This can be, as shown in FIG. 6, one or more terminal numbers of the line, a diameter of the line, and/or a number associated with the line.

The recognition unit EE and the length measuring unit LE can be embodied in this case as a single unit. For example, this can be the above-mentioned camera in this case.

Furthermore, the device V1 comprises a storage unit SE, by means of which the measured length 11 of the line L1 and the ascertained identifier of the line L1 are stored. These are preferably stored with a reference to one another and associated with one another in this manner. The measured length 11 of the line L1 is thus retrievable by means of the identifier.

The storage unit SE can be a component of the length measuring unit LE and/or the recognition unit EE in this case. For example, the length measuring unit LE, the recognition unit EE, and the storage unit SE can be embodied as one unit. For example, it can be a photographic camera having corresponding function modules in this case. In particular, the camera can have function modules for executing the above-mentioned functions.

The storage unit SE can also be used, on the basis of the length, in particular determined by means of the length measuring unit LE, and a starting length 10 of the first line L1, which is stored in the storage unit SE and is preferably identified by means of the identifier, for example, to determine a configuration length (remaining in the electrical installation assembly), preferably by subtraction between the determined length 11 of the first line L1 and the starting length 10.

Multiple line types can be stored in the storage unit SE and preferably each can be associated with one, in particular precisely one identifier. Moreover, the starting length 10 of the line L0 can be stored in the storage unit SE.

Furthermore, a line conveyor unit TE can be a component of the device V1. The line conveyor unit TE can be used in this case to retract the line L1 into the device V1 and/or dispense the line L1 out of the device V1. This can involve one or more rollers and/or a track here.

In addition, a detection unit DE can be a component of the device V1. The detection unit DE can be designed, for example, in the form of a light barrier, i.e., it can recognize the interruption of a light barrier and output an electrical signal. The insertion of a line into the device V1 can thus be recognized. Moreover, a reference point for the length measurement can thus be generated.

Furthermore, a communication unit KE can be provided, which is preferably operatively connected to the storage unit SE and is used to transmit the identifier and/or the line type and the length of the first line L1, in particular to a cutting-to-length unit (not shown). This communication unit KE can be part of the storage unit SE in this case. As already described, the storage unit SE, the communication unit KE, the length measuring unit LE, and the recognition unit EE can be embodied as a single unit.

The length 11 of the line L1 and the associated identifier may be transmitted by means of the communication unit KE and furnished to finish a line section L2 for use in an electrical installation assembly. For this purpose, a starting length 10 associated with the identifier is determined. The measured length 11 of the line L1 is subtracted from this starting length 10, to thus obtain the length of the line L2 remaining in the electrical installation assembly. Proceeding from this ascertained length L2, lines having corresponding length 12 can then be produced. These lines L2 can be used, for example, for wiring a second control cabinet. This second control cabinet can be a structurally-equivalent control cabinet to the one which was wired by means of the line L2, as described above, i.e., the first control cabinet.

The device V1 can furthermore comprise an identification unit (not shown) for applying an identification KX to a line L, L0, L1, L2. The line L0 can thus be identified before the wiring in the electrical installation assembly and the starting length 10 can also be acquired by means of the device B1. The device V1 can thus also subsequently be used to define the length 11 of the line L1 and thus the length 12 of the line L2 remaining in the electrical installation assembly can be defined. The identification unit can thus be used to identify the electrical line L, L0, L1, L2 with an identification KX, by means of which the starting length 10 is definable. The first line L1 is identifiable, preferably uniquely, by means of this identification KX and/or the associated identifier.

The recognition unit EE can identify the first line L1 on the basis of an identification KX, which is a component of the line, for example. Subsequently, on the basis of the length 11 of the first electrical line L1 that is cut to length and a starting length 10 determined by means of the identifier, the length 12 of a line L2 can be determined.

The recognition unit EE can also be used to define the identifier on the basis of an identification KX, using which the first line L1 is identifiable, which identification KX is applied in particular to the surface of the first line L1, preferably on the surface. The identification KX can be applied to the surface of the first line L1, preferably on the surface.

The device V1 can consist of one or more of the above-mentioned units, and in particular does not comprise a cutting-to-length unit for cutting an electrical line to length.

Figure 8:
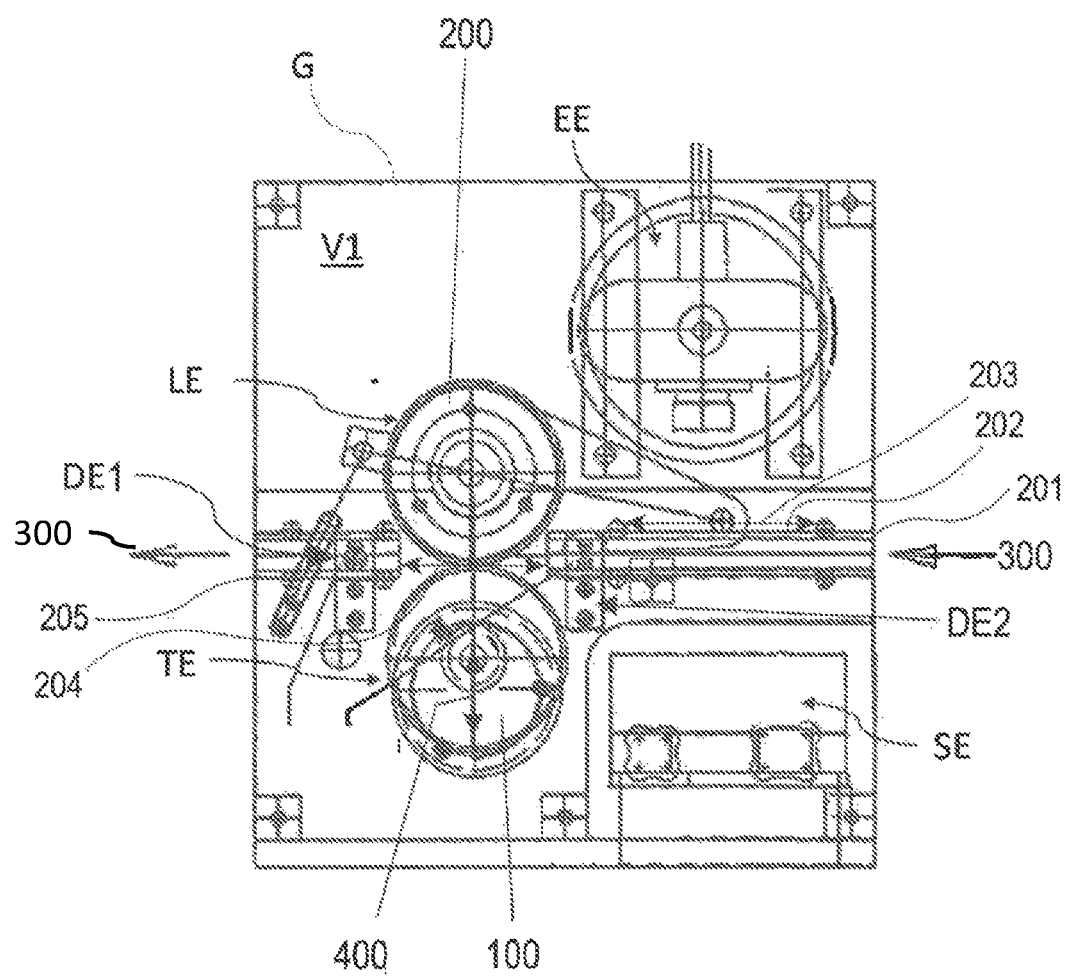
FIG. 8 shows a schematic illustration of a further embodiment of a device for determining a length.

FIG. 8 shows a further embodiment of the device V1 for determining the length of a line.

The device V1 comprises an inlet 201 for inserting an electrical line L1. At least one first cable channel 202 is arranged in the region of the inlet 201, which is provided for guiding the line L1 inside the device V1. The line L1 is taken out via an outlet 205 on a side of the device V1 opposite to the inlet 201.

A first measuring section 203 for the determination of the identifier by means of the recognition unit EE can be provided along the first cable channel 201. Furthermore, a second measuring section 204 for determining the length 11 of the first line L1 is provided inside the device V1. These measuring sections 203 and 204 are arranged in succession in this case. An identification KX of the line L1 is acquired in this case by means of an optical acquisition, in particular by a recognition unit EE designed as a photographic camera, which is arranged perpendicularly to the cable channel.

The line L1 at least partially inserted into the device V1 is conveyed via a line conveyor unit TE in a feed direction 300 from the inlet 201 to the outlet 205.

The line conveyor unit 5 illustrated in FIG. 8 comprises one or more first rollers 100 and one or more second rollers 200. In the example of FIG. 8, the first roller 100 is arranged below the line L1 in the direction of gravity in the conveyor mode. It is motor-driven and is used to feed the line inside the device V1.

The roller 100 can also be referred to as a transportation roller. It can be movably mounted, in particular spring-loaded, perpendicularly or diagonally in relation to the feed direction 300 of the line L1, so that the line L1 is pressed with a defined contact pressure against the second roller 200.

The second roller 200 can be designed as a bearing roller, which also rotates.

Of course, the rollers 100 and 200 can also be provided exchanged in their function in the device, so that the second roller 200 is a motor-driven transportation roller. Moreover, second roller 200 can also be movably mounted, in particular spring-loaded, both as a bearing roller and also as a transportation roller, perpendicularly or diagonally in relation to the feed direction 300 of the line L1.

One of the two rollers 100 or 200 can be designed as a so-called counter wheel, also known as an incremental transducer, as part of a length measuring unit LE.

As described above, the length 11 of the line L1 can be determined by means of a length measurement, for example, via the rotation of the rollers 100, 200. Both the length measuring unit LE and also the recognition unit EE are connected to a storage unit SE, in which the respective results of the length measurement and the recognition unit EE are stored.

To obtain the most precise possible length measurement, a first detection unit DE1 is also provided to ascertain a reference point for the length measurement, by means of which a line beginning can be recognized. If a line L1 is recognized at the detection point, an offset can be added to the length ascertained by means of the length measuring unit LE and this corrected length can be stored together with the identifier of the line L1 in the storage unit SE.

Furthermore, the device V1 comprises a housing G, in which the recognition unit EE, the length measuring unit LE, the detection unit DE1, and the storage unit SE are arranged.

The length measuring unit LE can preferably be designed as an incremental transducer in the form of a counter wheel.

The device moreover comprises a second detection unit DE2 for detecting a line end.

Due to the movable mounting of the rollers 100 and 200, a clamping mechanism can be implemented, for example, by springs or the like, which press the transportation roller 100 against the bearing roller 200, wherein the line is provided pressed and/or clamped between the transportation roller 100 and the bearing roller 200. A further movement of the line in the feed direction 300 can take place due to the contact pressure and the rotation of the transportation roller 100, and the length measurement is performed by the functionality of the counter wheel of the transportation or the bearing roller 100, 200.

It is therefore advantageous if the transportation roller and/or the counter wheel is formed displaceable diagonally, in particular perpendicularly, in relation to the feed direction of the line, in particular to form a restoring force (see reference sign 400), to accommodate lines having larger cross section. The displaceability can be achieved, for example, by a spring mounting.

The above-mentioned second detection unit DE2 is provided so that the line conveyor unit TE automatically stops after the length measurement of the line L1. This second detection unit DE2 can also be a light barrier, however, other variants can also be provided to ascertain the line end, for example, a sensor for ascertaining the contact pressure of the transportation roller or the like.

The device can moreover comprise a supply device for the insertion and the transportation of lines having different line diameters. The supply device can be partially implemented in the recognition unit EE.

Figure 8A:
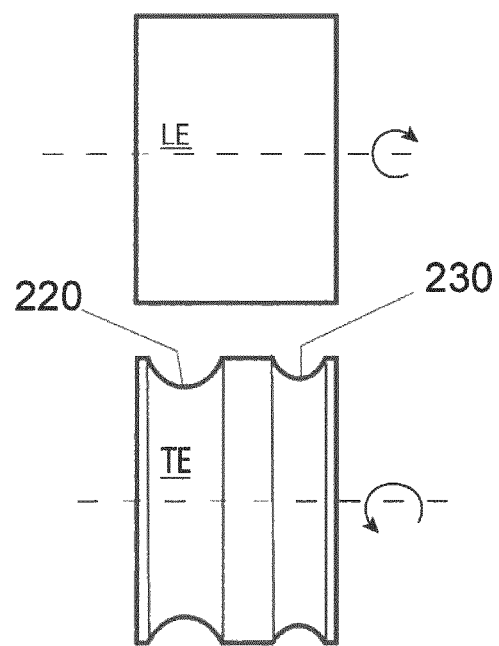
FIG. 8a shows a schematic detail illustration of a detail of the transportation device shown in FIG. 8 from the viewing direction of the feed direction.

Furthermore, the transportation roller 100 of the transportation unit TE or alternately the bearing roller 200 comprises at least two runways 220, 230 having different groove depths and/or groove widths. The transportation roller is only shown laterally in FIG. 8, but is shown from the front, i.e., from the feed direction, in FIG. 8*a*. In this case, the bearing roller 200 is designed as an incremental transducer in FIGS. 8 and 8*a* and is thus also part of the length measuring unit LE.

Alternatively, at least two transportation rollers or bearing rollers 100, 200 each having only one runway can also be provided, preferably axially parallel to one another. In this case, the runways have different groove depths and/or groove widths in relation to one another.

After determining a line diameter or a variable dependent thereon, for example, the line cross section, a deflection of the line can be performed, for example, by deflecting the cable channel 202 and/or the transportation roller(s) and/or the bearing roller(s), so that the line is assigned to the runway that is most suitable for guiding the line L1 in the device with respect to the groove depth and/or the groove width.

After an acquisition of the line cross section, the assignment of the runway can thus be performed in dependence on the acquired line cross section.

Runways having excessively large groove width would obstruct the clamping of a line with small line diameter. In contrast, lines having excessively large line cross section can slip laterally out of the guide of the lines predetermined by the runway.

In one preferred embodiment variant of the invention, the identification KX comprises an identifier with respect to the line diameter, so that the determination of the line diameter can be performed by reading out the identifier.

Figure 9:
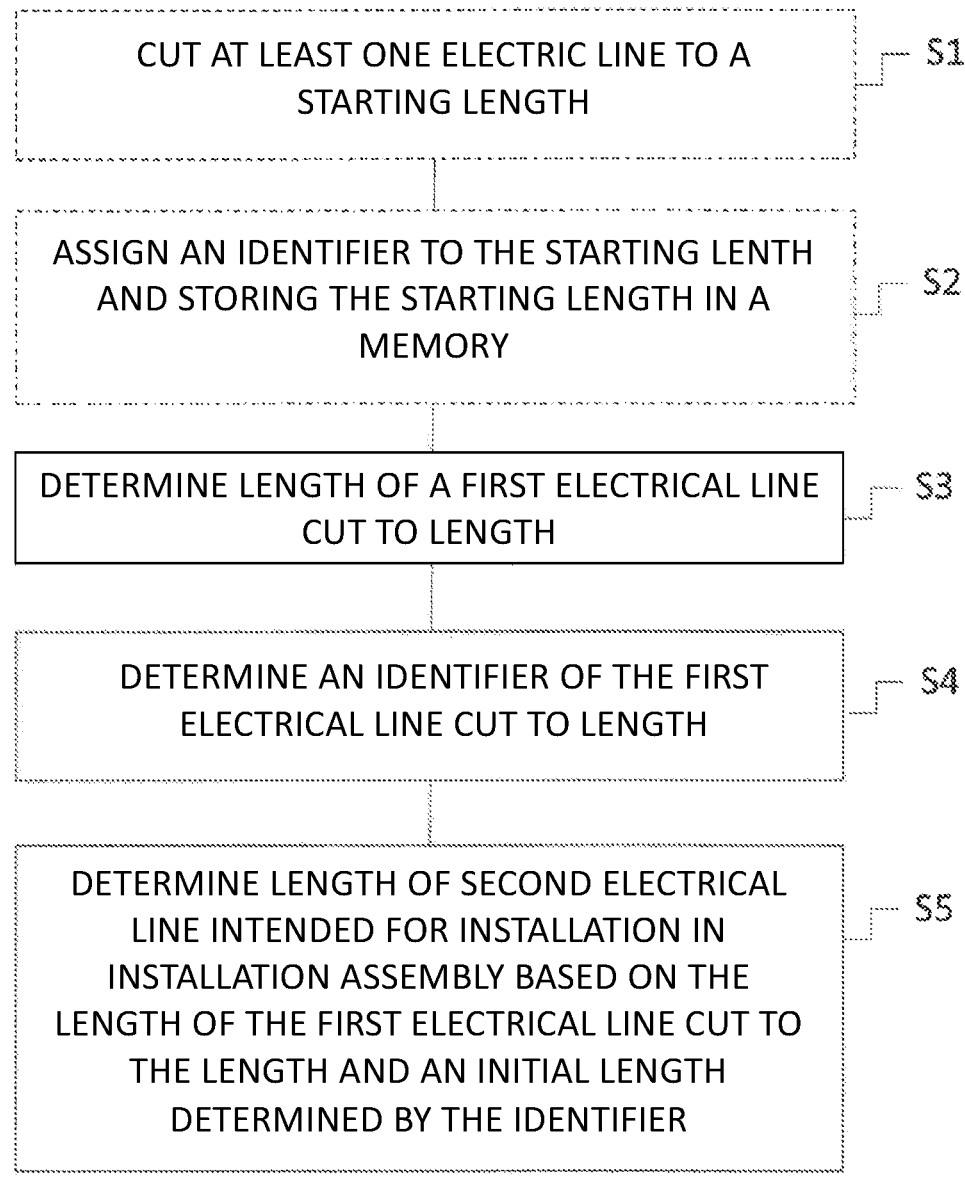
FIG. 9 shows a flow chart of an embodiment of a method for determining the length of a line.

FIG. 9 shows a flow chart according to one embodiment for determining the length of a line. In a first step S1, an electrical line L0 is cut to a starting length l0. In this case, the line L0 can be cut off from a line L wound into a cable roll, for example.

Multiple lines are preferably cut to corresponding starting lengths and these lines are then provided to an installer for wiring an electrical installation assembly, as shown in FIG. 1. Thus, for example, lines of different line types having various starting lengths and/or equal starting lengths are produced. The starting length l0 is preferably dimensioned in this case so that it is sufficient to be connected to the provided terminals in the electrical installation assembly.

Furthermore, one embodiment of the method comprises, for example, following step S1, a step S2 in which an identifier of the line L1 is associated with the starting length l0 of this line L1 and preferably stored. If multiple lines are provided, each identifier assigned to one of these lines can be associated with a starting length. One starting length l0 can preferably be associated with multiple identifiers in this case, but one identifier can be associated with at most one starting length.

The starting length l0 and the identifier can be stored in this case in a central database or a facility planning tool. A corresponding identification KX can be applied by means of an identification unit, for example, a printer, on the line L. On the other hand, an identification KX already provided on the cable can be used as the identifier, and this can be associated with the starting length l0.

The line L0 can then be connected via a first of its ends to a terminal provided for this purpose, for example, a cable clamp. The line L0 can then be cut to length in such a way that the line L0 is connected via an end resulting by cutting to length to a second terminal provided for this purpose. A first excess line L1 and a second line L2, which remains in the electrical installation assembly, for example, in a control cabinet and/or in a control cabinet partition and/or is provided to remain in the electrical installation assembly, result in this case.

If more than one line L0 is required for wiring the electrical installation assembly, multiple lines L1 thus result accordingly, under certain circumstances having different lengths because of the different distances between the terminals which are to be connected by means of the respective line.

The length of the first line can then be determined in a step S3, for example, by means of a length measuring unit LE.

In a step S4, an identifier of the first electrical line L1 cut to length can then be determined, for example, by means of a recognition unit EE. The specified sequence of steps S3, S4 is not absolutely required in this case. The length l1 of the first line L1 can be stored together with the identifier. Subsequently, the length and identifier can be transmitted to the central database and/or to a facility planning or management tool, for example, by means of a communication unit KE. This procedure can be repeated for multiple lines which result during the wiring.

In a step S5, the length of a second electrical line intended for installation in an electrical installation assembly can be determined based on the length l1 of the first electrical line L1 cut to length and a starting length l0 determined by means of the identifier. For this purpose, the starting length of the line L0 can be determined based on the identifier. The length l2 can be determined by way of the measured length of the line L1 by subtraction. In addition, an offset can be used to further optimize the length L2.

Further electrical lines can then be produced on the basis of this length L2, which are required for the wiring of the electrical installation assembly. In particular, completely configured electrical lines can thus be produced in a simple manner for the wiring of identical electrical installation assemblies, for example, control cabinets or control cabinet partitions.

The above-mentioned steps can be at least partially repeated to configure multiple lines and to determine the corresponding lengths l0, l1, and/or l2. The lines of a cable harness can thus be configured and their respective lengths l0, l1, and/or l2 can be acquired. This is particularly advantageous when wiring a control cabinet, in particular for producing preconfigured lines of a cable harness and/or for producing small series of lines and/or cable harnesses.

However, it is also possible in the scope of the present invention to use a wiring set having preconfigured lines to prepare for second control cabinets, wherein the second control cabinets are not identical or structurally equivalent to the first control cabinet.

This variant will be described in greater detail hereafter and can be implemented as an additional option of the method according to the invention:

In an optional further step, the equipment data can preferably be analyzed in combination with a control-cabinet-specific plan or a control-cabinet-specific documentation, for example, with a layout plan prepared by the facility planning tool and/or with the circuit diagram of the first control cabinet and/or the control cabinet layout. These data sets can be prepared by so-called M-CAD computer system.

The layout plan and/or the circuit diagram and/or the control cabinet layout of the first control cabinet can be compared to a layout plan and/or a circuit diagram and/or a control cabinet layout of the second control cabinet.

It is thus possible that the line can be associated based on its identifier, for example, by a computer, with a circuit environment, for example, a control cabinet or an arrangement of multiple control cabinets or a control cabinet partition. The computer program can be stored on a data memory of the device according to the invention for determining the length of a line or on a data memory on a computer remote from the device, to which the ascertained data are transmitted.

The circuit diagram environment can advantageously be combined with a wiring diagram.

Furthermore, the voltage can additionally be checked and assigned on a wiring diagram, for example, by the external computer or by the device according to the invention.

The identifier KX can thus be used for the identification of the line in a plan, in particular in a wiring diagram.

This can preferably be performed by an analysis unit, which is preferably part of the device according to the invention for determining the length of a line or is also preferably part of a computer, which particularly preferably comprises a communication connection to the device for determining the length of a line.

The analysis unit can comprise in this case a processor, for example, a comparator, and a data memory, on which the corresponding data sets to be compared are stored.

The components and/or wiring elements which are also implemented in the second control cabinet identically to the first control cabinet can be transmitted, for example, by the device or the computer, to the producer for pre-configuring the wiring set. Furthermore, a list of the wiring elements is transmitted, which are contained in the second control cabinet in addition in comparison to the first control cabinet or which are omitted or are implemented having a different length The producer then delivers the preconfigured cables jointly with the non-preconfigured cables, for which no length specifications or only approximate length specifications were transmitted to set a starting length 10.

Material can be saved by the partially preconfigured cables and the transportation weight of the wiring set can advantageously be reduced when delivering the wiring set. In addition, the advantages are transferable to control cabinets having nonidentical layout. Moreover, M-CAD geometry data of the control cabinet, which are provided in the system in any case, are advantageously used by the above-described method option for the preparation of a partially preconfigured wiring set.

In one preferred embodiment variant of the present invention, the identification KX can comprise both an identifier of the individual line and also an identifier of a wiring set.

The identifier can comprise in particular the identification of a facility and/or industrial facility, a location, or a project. While the facility and the location are fixed terms in wiring technology, in the case of a project, this can be a control cabinet partition, a complete control cabinet, or multiple control cabinets at the location. The wiring set can be associated, for example, with one of multiple control cabinets at a location of the facility.

The identification of the facility, the location, and the product can be compared to a connection list, which can be stored as a data set on the device for line length determination and/or on an external computer.

The identification KX can also comprise a starting length in addition to the identifier. However, the starting length 10 of the line before the cutting to length can also be stored on a storage unit, for example, on the device for determining the length of a line, or on the external computer, since some identification variants, for example, the barcode, only comprise limited storage space.

Figure 17:
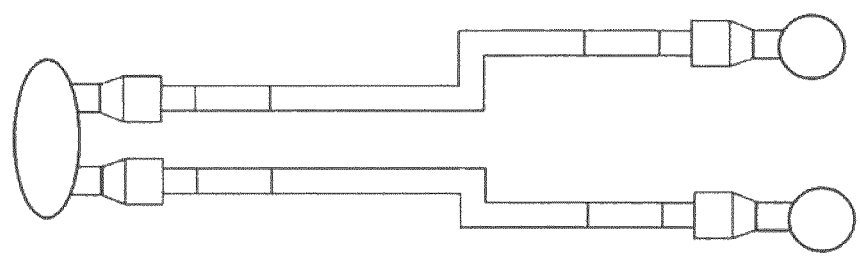
FIG. 17 shows an illustration of a problem resulting in the case of the previous configuration.

This problem described at the outset on the basis of FIG. 17 may be graphically represented on the basis of the double occupancy shown.

Figure 10:
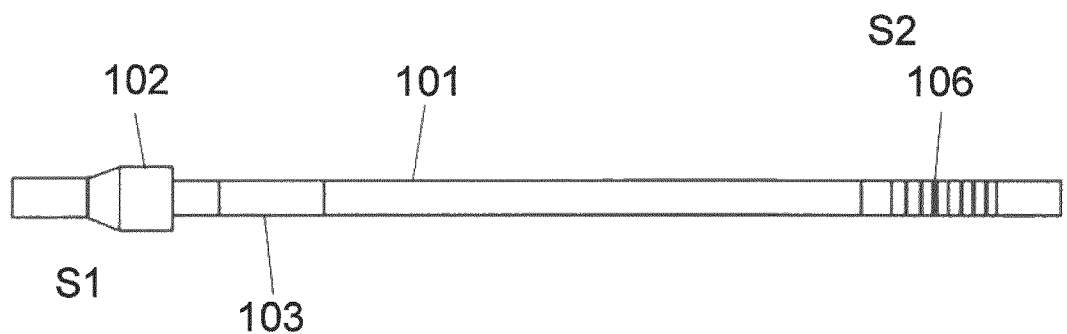
FIG. 10 shows a line in the partially preconfigured delivered state.

The partially preconfigured line 101 according to the invention shown in FIG. 10 is only configured on a first side S1.

Figure 11:
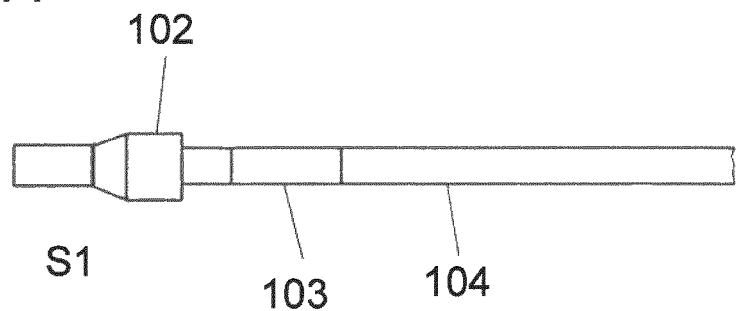
FIG. 11 shows the line of FIG. 10 after the configuration and the installation in an electrical installation assembly.
Figure 12:
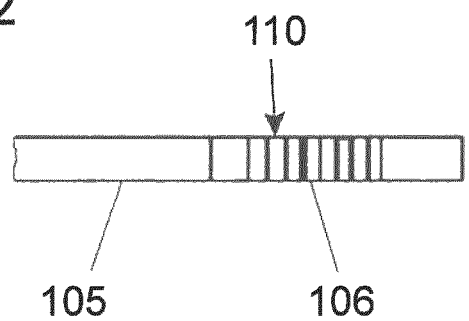
FIG. 12 shows a cable excess after the installation of the line of FIG. 11.

In the specific case of the exemplary embodiment of FIG. 10 and FIG. 11, this means that the worker is provided with a line which, for example, already bears a line connector 102 on one side and already comprises one or more first identification carriers 103, which provide the worker the information about the correct terminal point in the electrical installation assembly, in particular the control cabinet or the control cabinet partition.

In this case, the line 101 is already embodied in the correct type (for example, cable cross section) and in the correct color.

The line 101 itself is trimmed somewhat too long, for example, to a yardstick amount, in which the line 101 is delivered. The specific shortening of the line 101 takes place at the location of the installation of the line.

The second side S2 does not yet bear a line connector or an identification carrier, as can be seen from FIG. 10, since it still has to be cut to length.

In this manner, in a first method step a), the provision of the line 101, which is partially preconfigured, in particular on one side, is performed by delivery to the location at which the two terminal points of the electrical installation assembly are to be wired.

The cutting to length is performed to form a first line 104, the remaining section, which is usually only considered to be a waste product, and to form a second line 105, which now has the exact length for installation in the electrical installation assembly.

In this case, a line connector would be severed on the second side from the second line to be installed in the case of a completely configured line and would be located on the remaining section, i.e., the first line. This would also apply in the majority of cases to the identification carrier.

However, the second side of the line from step a) comprises an identification 106, which is arranged at or on the line. This identification 106 comprises items of information to prepare a second identification carrier 107 for identifying a second of the two terminal points. The identification 106 can be formed as a code 110, which identifies the line 101 itself or the identification carrier 107 to be applied.

In this case, exclusively one identification per line is sufficient. A continuous, in particular equidistant identification linked with a high printing expenditure is not necessary in this case.

The identification 106 can be, for example, a wraparound label having a barcode or QR code.

This identification 106 can be located on the first line 104 after the cutting to length.

Figure 13:
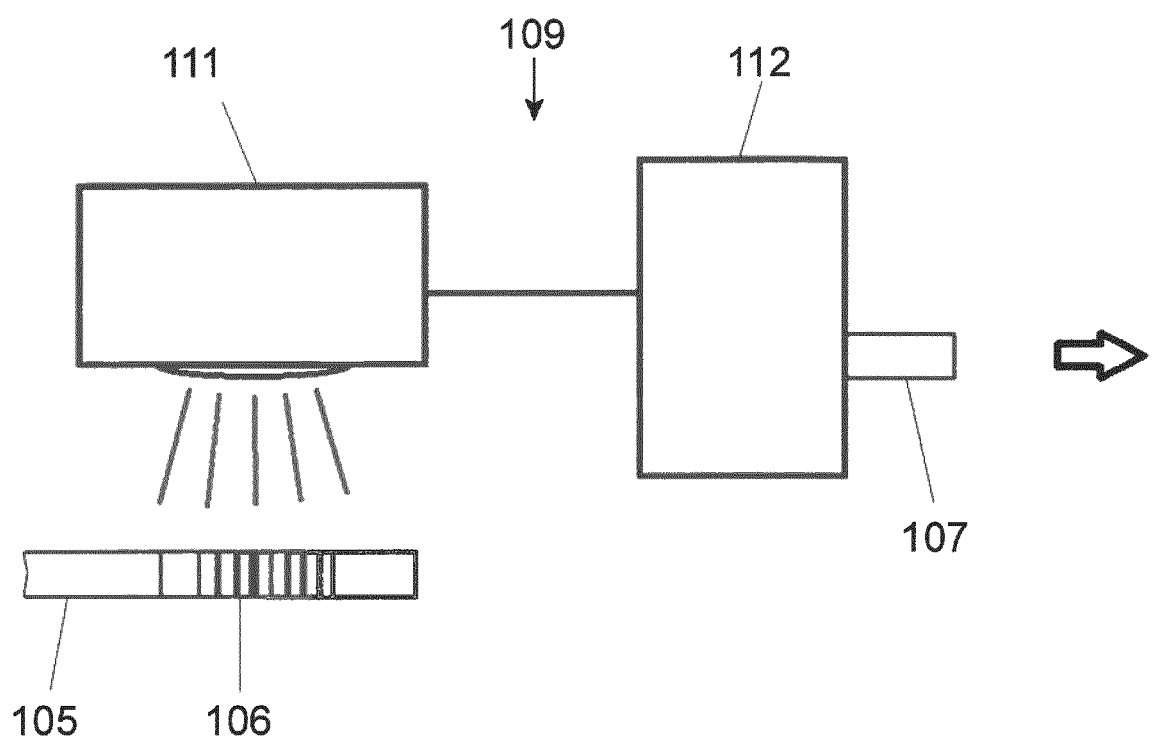
FIG. 13 shows a preparation of an identification carrier.

Based on the identification, a readout can be performed in a step c) by a readout device 109, for example, comprising a scanner 111 and a printer 112, and preparation of the second identification carrier 107 for identifying the second terminal point in the electrical installation assembly. This is shown in FIG. 13.

The readout device can be designed, for example, as a station, in which a scanner reads the code and a printer provides the required identifier on an identification carrier.

Figure 14:
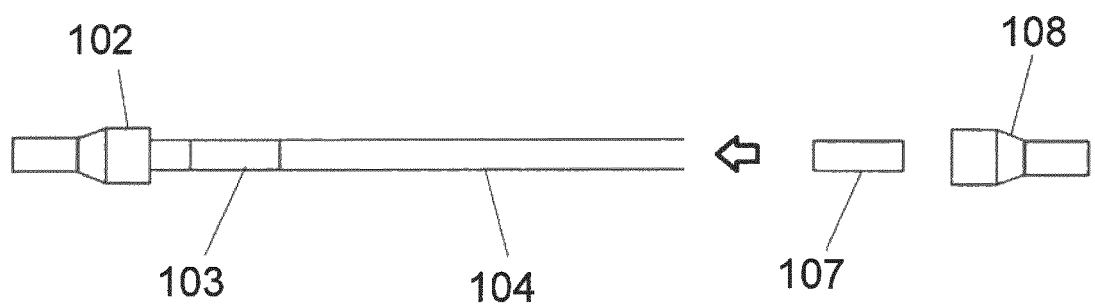
FIG. 14 shows an assembly of a line.

The second identification carrier 107 is applied on the second line 105 in a step d). This also applies to a second line connector 108. This is schematically shown in FIG. 14.

Figure 15:
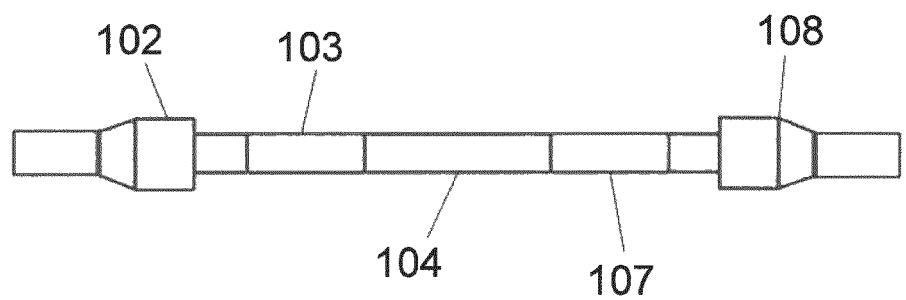
FIG. 15 shows an illustration of a completely configured line.
Figure 16:
FIG. 16 shows an illustration of a solution known per se of a partially preconfigured line.

Finally, the completely configured line 105 illustrated in FIG. 15 can be installed in the electrical installation assembly.

The method can thus additionally solve the problem of associating an identification carrier with a line if the line has to be cut off before the installation and the identification carriers to be used are not displaceable.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for determining the length of a line, the method comprising:
    a) determining a length of a first electrical line;
    b) determining an identifier of the first electrical line; and
    c) determining a length of a second electrical line based on the length of the first electrical line and a starting length determined by means of the identifier,
    wherein the first and second electrical lines are intended for installation in an electrical installation assembly,
    wherein the starting length corresponds to an electrical line;
    wherein the first electrical line and the second electrical line are formed by cutting the electrical line to length, and
    wherein the second electrical line is partially preconfigured.

2. The method of claim 1, further comprising:
identifying the first electrical line based on the identifier, wherein the starting length is determined based on the identification of the first electrical line.

3. The method of claim 2, further comprising:
cutting the electrical line to the starting length;
associating the identifier with the starting length; or
storing the starting length and an associated identifier.

4. The method of claim 1, further comprising:
identifying an electrical line using an identification corresponding to the identifier, wherein the identification is applied to or on a surface of the line.

5. The method of claim 4, further comprising:
acquiring the identification of the first line or the second line by an image recognition unit; or
determining the identifier on the basis of the acquired identification.

6. The method of claim 1, further comprising:
cutting to length the electrical line for wiring an electrical installation assembly to produce a first, excess electrical line and the second electrical line.

7. A method, comprising:
producing a first wiring set of electrical lines, wherein the first wiring set of electrical lines are each provided with at least one identification, wherein the at least one identification is associated with a starting length based on an identifier that is determinable based on the identification; and
for each electrical line of the first wiring set of electrical lines
    a) determining a length of a first electrical line;
    b) determining an identifier of the first electrical line; and
    c) determining a length of a second electrical line based on the length of the first electrical line and a starting length determined by means of the identifier,
    wherein the first and second electrical lines are intended for installation in an electrical installation assembly,
    wherein the starting length corresponds to an electrical line;
    wherein the first electrical line and the second electrical line are formed by cutting the electrical line to length, and
    wherein the second electrical line is partially preconfigured.

8. The method of claim 7, further comprising:
producing a second set of electrical lines, wherein
the first wiring set of electrical lines is intended for a first control cabinet and the second wiring set of electrical lines is intended for a second control cabinet,
during the production of the second wiring set of electrical lines a control-cabinet-specific plan or a control-cabinet-specific documentation of the first control cabinet is compared to a control-cabinet-specific plan or a control-cabinet-specific documentation of the second control cabinet and the electrical lines of the second wiring set of electrical lines, which are implemented identically in both the first and second control cabinet, are preconfigured.

9. The method of claim 8, wherein electrical lines that are not identically implemented are contained in the second wiring set of electrical lines having a starting length or are omitted.

10. A device for determining the length of a line, the device comprising:
    a recognition unit configured to determine an identifier of a first electrical line, wherein the identifier is an identification at or on a surface of the first electrical line,
    a length measuring unit configured to determine a length of the first line;
    a storage unit operatively connected to the recognition unit and the length measuring unit, wherein the storage unit is configured to acquire the identifier and the length of the first electrical line and associate the identifier and the length of the first electrical line with one another;
    a detection unit configured to determine a starting point of a length measurement of the first electrical line; and
    a second detection unit configured to detect an end of the first electrical line.

11. The device for determining the length of a line of claim 10, further comprising:
a line conveyor unit configured to transport electrical lines having different conductor diameters, wherein the line conveyor unit comprises runways having different groove depths or groove widths, wherein supply of the electrical lines on respective ones of the runways is performed based on a determined conductor diameter or cross-section of the conductor.

* * * * *